United States Patent [19]

Hebaus

[11] Patent Number: 5,031,655
[45] Date of Patent: Jul. 16, 1991

[54] SELF-LOCKING VENT VALVE

[75] Inventor: Michael B. Hebaus, Renton, Wash.

[73] Assignee: The Boeing Company, Seattle, Wash.

[21] Appl. No.: 495,373

[22] Filed: Mar. 19, 1990

[51] Int. Cl.$^5$ .......................................... F16K 31/24
[52] U.S. Cl. ..................................... 137/202; 137/445;
137/448
[58] Field of Search ........................ 137/202, 445, 448

[56] References Cited

U.S. PATENT DOCUMENTS

| | | | |
|---|---|---|---|
| 1,007,616 | 10/1911 | Tillison . | |
| 1,119,980 | 12/1914 | Mulligan | 137/202 X |
| 1,244,177 | 10/1917 | Crispin | 137/202 |
| 1,675,270 | 6/1928 | Hurst . | |
| 1,725,820 | 9/1928 | Mumma . | |
| 1,989,423 | 1/1935 | Miller | 137/122 |
| 2,404,795 | 7/1946 | Garretson | 137/68 |
| 2,845,937 | 8/1958 | Ksieski | 137/202 X |
| 2,944,562 | 7/1960 | Glasgow et al. | 137/270 |
| 3,168,103 | 2/1965 | Kochaver | 137/202 |
| 3,402,614 | 9/1968 | Malette | 74/100 |
| 3,599,659 | 8/1971 | Nuter | 137/202 |
| 3,721,256 | 3/1973 | Barnard | 137/805 |
| 3,916,945 | 11/1975 | Bennett | 137/445 |
| 4,230,142 | 10/1980 | Saarem | 137/202 |

Primary Examiner—Alan Cohan
Attorney, Agent, or Firm—Joan H. Pauly

[57] ABSTRACT

A plate (42) is mounted to the outer flange (12) of a standpipe (10). A valve element (96) and a float (68) are mounted on the plate (42) to pivot about fixed axes $A_1$, $A_2$, respectively. A toggle link (90) extends between the valve element (96) and the float (68) and is connected thereto at pivot points $P_1$, $P_2$, respectively. When the float (68) moves into its down position in which the valve element (96) is in an open position, the float (68) passes over a center line C defined by the fixed axis $A_2$ and the pivot point $P_1$. This overcenter movement of the float (68) prevents the valve element (96) from moving into a closed position unless the float (68) is moved upwardly by a rising liquid level.

9 Claims, 5 Drawing Sheets

SELF-LOCKING VENT VALVE

Government Rights

The Government has rights in this invention.

DESCRIPTION

1. Technical Field

This invention relates to valves for closing vent openings in ullage areas of aircraft fuel tanks and, more particularly, to such a valve which has a float and a valve element that are pivotably mounted to a fixed structure and are operatively connected to each other by a toggle link, and in which the connection between the float and the toggle link moves past a center line when the float moves into its down position to lock the valve element in its open position.

2. Background Art

The ullage area of an aircraft fuel tank is normally vented to allow air to flow out of the tank as the volume of the fuel in the tank increases, and into the tank as the fuel volume decreases. The venting also allows the air pressure in the tank to equalize with the atmospheric pressure around the aircraft. During flight of the aircraft, the changing attitude of the aircraft and fuel tanks shifts the fuel in the tanks so that it sometimes submerges vent openings. In order to avoid the introduction of fuel into the vent system, fuel tank vent openings are commonly provided with vent valves that close when the fuel level approaches the vent openings and open when the fuel level subsides. Float valves are particularly wellsuited to opening and closing a valve port in response to a changing liquid level and are commonly used as vent valves in aircraft fuel tanks.

The environment in an aircraft fuel tank presents a number of constraints on the design of a float valve for use as a vent valve in the tank. The valve must be relatively insensitive to various types of contamination that are unavoidable in a fuel tank. In a typical aircraft fuel tank, both the fuel and the air from the vent system contain particle contamination. For example, the vent system typically vents the tanks to atmosphere, and thus, the air in the tank commonly contains dust from the atmosphere. In addition, the fuel itself commonly includes particle contamination. Such contamination may consist of dust from the atmosphere, silica, and, in the case of composite material tanks, particles of graphite and/or epoxy.

In addition to the requirement that the valves maintain full operability in the presence of particle contamination, fuel tank vent valves are subject to the requirement that they be operable in very low clearance areas. In order to make maximum use of the fuel tanks and allow the tanks to be filled as full as possible, the vent openings in the tanks are positioned as close as possible to the tops of the tanks. Therefore, the vent valves associated with vent openings must operate in a limited confined area near the tops of the tanks.

The proper functioning of the fuel system of the aircraft generally requires that the air pressure in the fuel tanks remain at or very near atmospheric pressure. Therefore, it is important that any vent valves in the tank close only when it is necessary to prevent fuel from entering the vent system, and reliably remain open at all other times. In the operation of an aircraft, there are a number of factors which would tend to close a vent valve even though the fuel level is below the vent opening and the float is in a down position. One such factor is the vibrations that are a normal consequence of the operation of the aircraft The vibrations tend to jiggle the float and the valve element. Another factor which tends to change the position of the valve element independent of the liquid level is a pressure differential across the vent port. A pressure differential creates air flow either into or out from the tank through the vent port. This flow can act upon the valve element and tend to move it into a closed position. Still another factor which could tend to cause undesirable closing of the valve is the changes in the pitch attitude of the aircraft. When pitch attitude changes do not result in movement of the fuel level toward the vent opening, it is desirable for the valve to remain open.

All of the factors discussed in the last paragraph present potential problems with known vent valve structures. For example, in the type of previously used vent valve shown in FIG. 3, it has been observed that particular pitch attitudes in some aircraft have a tendency to close the valve regardless of the fuel level in relation to the float.

The patent literature includes numerous examples of float valves. U.S. Pat. No. 2,404,795, granted July 30, 1946, to O. L. Garretson, discloses a liquid trap float control valve for use in gas lines of an industrial gas system. The valve includes a ball float which depends downwardly into a liquid accumulator formed by the valve housing. The float is pivotably mounted to the housing by means of a bell crank which has a bifurcated end that is pivotably connected to a pair of parallel links. A valve element is also pivotably connected to the links and is translated by pivotable movement of the float to open and close an outlet. Sliding movement of the valve element is guided by a bracket and the projection of guide arms carried by the element into a screw plug which defines the valve seat. Gas enters the valve chamber, is deflected downward around the float, and exits through the outlet. The valve is described as resisting movement of the valve element against the seat during periods of a high rate of gas flow and a high pressure drop across the valve because the center line between the pivot connections of the valve element to the links and the float to the bracket "passes so close" to the pivot connection between the bell crank and the links. Garretson states that the mechanical advantage of the float is sufficient to overcome a tendency of the valve to stick or freeze in its open position following long periods of time in which the valve remained open.

U.S. Pat. No. 3,916,945, granted Nov. 4, 1975, to D. F. Bennett, discloses a float valve for controlling the flow of liquid from a holding tank to a wet well in a sewage treatment plant. The valve is mounted on a conduit and opens to allow liquid to flow out of the conduit. The float is slidably mounted on a rod which is connected to a vertically movable frame. The frame is mounted on the conduit by a parallelogram linkage. The upper links of the parallelogram linkage form bell cranks which are pivotably connected to an adjustable length rod at their distal ends. The distal end of the rod is in turn connected to a second pair of bell cranks which carry the plug valve. In the closed position of the valve, the rod is coplanar with the parallelogram linkage bell crank lever arms to which it is connected to resist any tendency for the valve to be forced open. Opening of the valve is also resisted by a counterweight which passes across a vertical plane passing through the pivot axis of the valve plug. Sliding vertical movement of the float causes the valve plug to pivot between open and closed positions.

U.S. Pat. No. 1,725,820, granted Aug. 27, 1929, to G. R. Mumma, discloses a quick action float valve for use in connection with water pans of furnaces and other liquid containers. The problem addressed by Mumma is leakage that tends to wear away the valve seat. Mumma avoids this problem by providing a valve that snaps open and closed so that it is always in a fully open or fully closed position. The valve includes a series of links, with a pivoting float connected to one end of the linkage, and a sliding valve member connected to the other end. The linkage includes a guide rod on which a spring biased U-shaped piece is slidably mounted. Pivoting of the guide rod causes compression of the spring. When the rod passes a position in which it is parallel to an adjoining link, the spring is free to quickly move the U-shaped piece to snap the valve open or closed.

Valves in which a spring is attached to the distal ends of connected links to quickly move said distal ends together when the links pass a parallel position are disclosed in U.S. Pat. Nos. 1,007,616, granted Oct. 31, 1911, to C. D. Tillison; No. 1,675,270 granted June 26, 1928, to J. Hurst; and U.S. Pat. No. 3,402,614, granted Sept. 24, 1968, to R. E. Malette. In the Tillison valve, pivoting of a float causes a rod to translate vertically. The rod engages one of the spring biased connected links to move the links past their center position It also engages a rocking lever that slides along the rod and pivots to move a valved down away from and toward the outer end of a pipe. The Hurst valve includes a semi-buoyant actuator that is connected by intermediate links to the spring biased links to pivot the links and, in turn, slide two valve members between open and closed positions. In the Malette valve, the spring biased links are pivotably attached to a mounting structure suspended from a conduit and are moved by the spring to hit a valve actuating lever to control the water level in a manhole.

An air vent valve for hot water radiators in which a float is connected to a sliding valve element by a plurality of links is disclosed in U.S. Pat. No. 1,989,423, granted Jan. 29, 1935, to J. C. Miller. A system for controlling the liquid level in a storage tank for water is disclosed in U.S. Pat. No. 2,944,562, granted July 12, 1960, to C. O. Glasgow et al. The system includes a float that actuates a pilot valve by rotating a gear wheel to move actuating arms clamped to the wheel into engagement with the stem of the pilot valve. U.S. Pat. No. 3,721,256, granted Mar. 20, 1973, to D. D. Barnard, discloses a flow control device for vehicle fueling systems which includes a pair of float balls that force a valve element against an orifice (FIGS. 5-7).

The above patents and the prior art that is cited therein should be studied for the purpose of putting the present invention into proper perspective relative to the prior art.

DISCLOSURE OF THE INVENTION

The subject of the invention is a float valve for closing a vent opening in a ullage area of an aircraft fuel tank in response to a liquid level in the tank rising toward the opening. The valve comprises a valve element, a float, and a toggle link. The valve element is mounted to pivot about a first fixed axis between a closed position in which it closes the opening and an open position in which it allows flow of gas through the opening into and out from the ullage area. The float is mounted to pivot about a second fixed axis between a down position and an up position, to pivot the valve element into its open and closed positions, respectively. The toggle link has first and second end portions pivotably connected to the valve element and the float, respectively, at first and second pivot points, respectively. The first pivot point is spaced from the first axis, and the second pivot point is spaced from the second axis. The fixed axes and the pivot points are positioned so that the second pivot point must cross a center line extending between the first pivot point and the second axis when the float moves from its down position to its up position. This positioning causes the float to resist movement of the valve element into its closed position in the absence of an upward force on the float caused by a rising liquid level.

The valve element and the float may be mounted to various structures. In order to help maximize the simplicity of the structure of the valve and the ready adaptability of the valve to the structural details of various types of fuel tanks, the valve element and float are preferably pivotably mounted to a mounting plate. The plate may be formed with an opening extending therethrough to provide clearance for the second pivot point when the float moves into its up position. This arrangement helps to maintain the compactness of the valve structure. Additional preferred features may be incorporated into the valve to further advance the goals of simplicity of structure, versatility, and compactness. One such feature is a mounting plate that includes a valve seat which the valve element sealingly engages when the element is in its closed position. The plate may have mounting portions around the seat adapted to be secured to an outer flange portion of a standpipe. Another such feature is inclusion in the mounting plate of a stop surface that engages a portion of the float to limit downward movement of the float. Still another such feature is the provision of a projecting mounting lug on the float to which the toggle link is pivotably connected. The mounting lug arrangement facilitates providing clearance for the second pivot point through the mounting plate.

The valve of the invention solves the problem discussed above of the tendency for known float valves in aircraft fuel tanks to close even though the fuel level is not moving toward the vent opening. The toggle connection between the valve element and the float and the over-center movement of the float provide positive resistance to movement of the valve element into a closed position in response to pressure on the valve element. Therefore, the valve reliably remains open to ensure proper venting of the tank in the presence of a pressure differential across the valve and air flow in either direction through the valve. The moving of the float pivot point past the center line when the float moves into its down position also causes the float to resist upward movement in response to vibrations or changes in the pitch attitude of the aircraft. Since the float is past the center line, jiggling of the float due to normal aircraft vibrations is insufficient to move it past the center line.

The valve of the invention also avoids problems that may be encountered because of the special environmental conditions in an aircraft fuel tank. The basic structure of the invention does not require any sliding connections or guiding contacts which could be vulnerable to jamming because of contamination by particles from the air and/or fuel. All of the connections in the basic valve structure are pivotal connections, which by their nature are less vulnerable to jamming. The valve also has the additional advantages of simplicity of structure, reliability and durability in operation, full operability in confined low clearance areas, and ready adaptability to various types of vent port arrangements.

These and other advantages and features will become apparent from the detailed description of the best mode for carrying out the invention that follows.

BRIEF DESCRIPTION OF THE DRAWINGS

In the drawings, like element designations refer to like parts throughout, and.

BEST MODE FOR CARRYING OUT THE INVENTION

Figure 2:
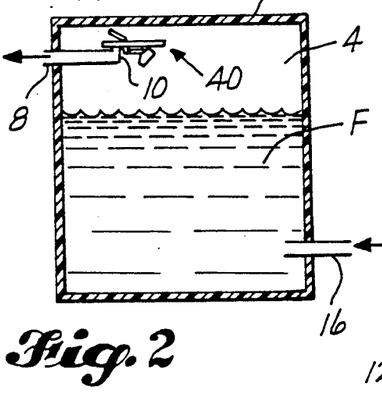
FIG. 2 is a simplified vertical sectional view of one of the fuel tanks shown in FIG. 1.
Figure 7:
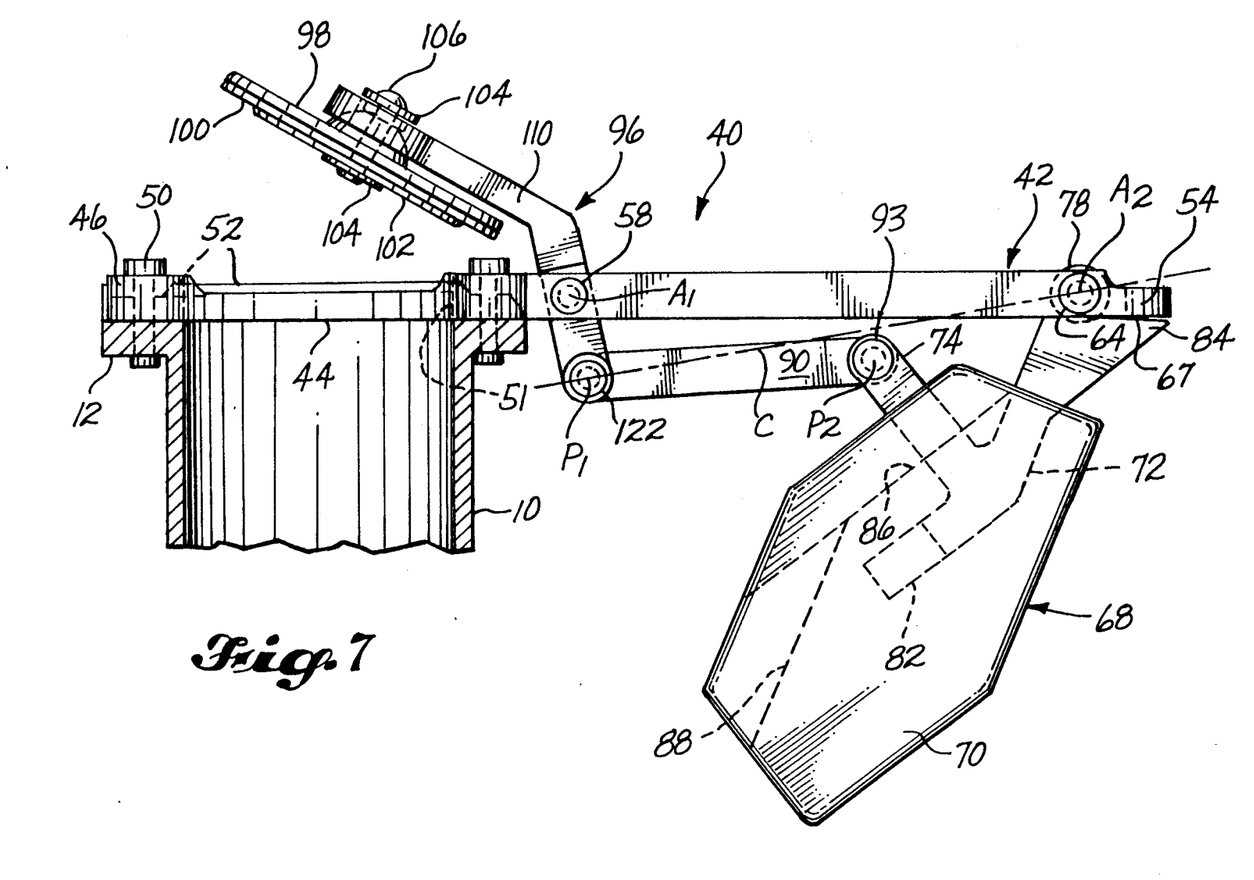
FIG. 7 is an elevational view of the valve shown in FIGS. 4-6 in its open position mounted on a standpipe, with the standpipe shown in section.
Figure 8:
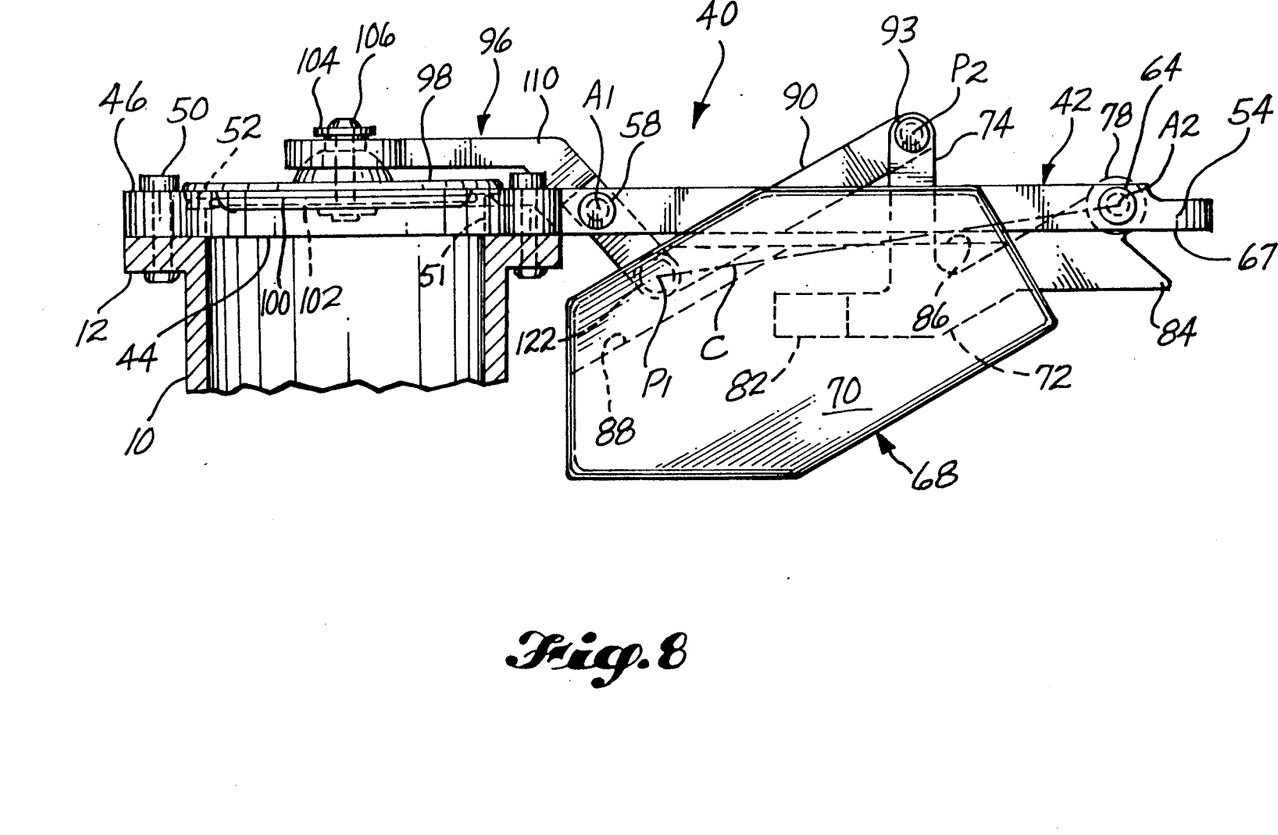
FIG. 8 is like FIG. 7 except that it shows the valve in its closed position.

The drawings show a valve 40 that is constructed according to the invention and that constitutes the best mode for carrying out the invention currently known to the applicant. In FIGS. 2, 7, and 8, the valve 40 is shown mounted on the open vent end of a standpipe 10. It is anticipated that this type of installation will be a primary application of the valve of the invention. However it is of course to be understood that the valve of the invention may also be used to advantage in connection with other types of vent openings.

Figure 1:
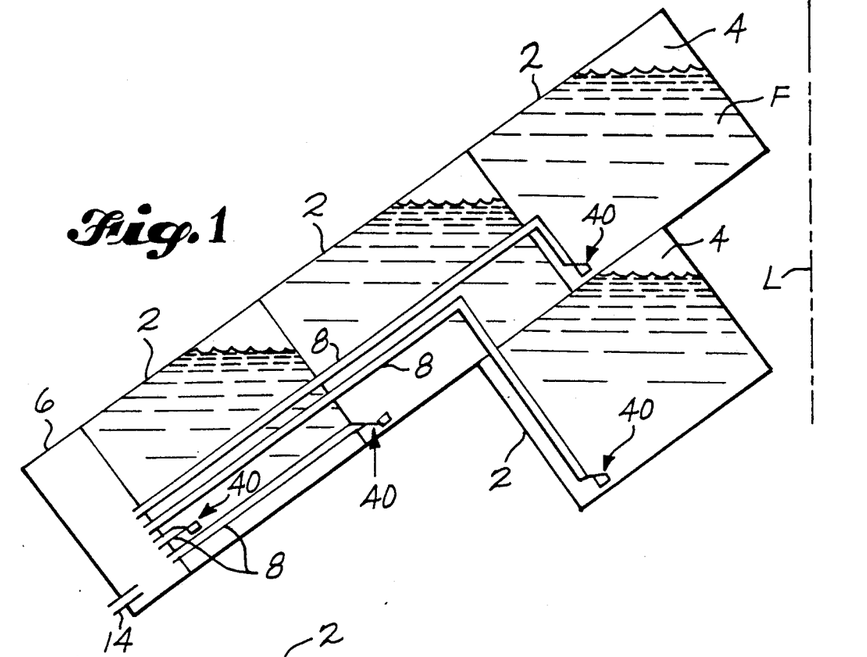
FIG. 1 is a schematic plan view of one type of fuel tank arrangement into which the valve of the invention may be advantageously incorporated.

FIG. 1 is a schematic top plan view of the fuel tanks 2 on one side of an aircraft. Foreground portions of the aircraft have been omitted to reveal the interior structure of the tanks 2 and the vent system. The centerline of the aircraft is indicated by the broken line L. FIG. 1 represents the fuel tanks 2 when the aircraft is in a climb condition. The fuel F in the tanks 2 has moved to the rear portions of the tanks 2 and is covering the dive vent ports to prevent fuel from entering the vent lines 8. The vent lines 8 communicate the interior area of the tanks 2 with a vent tank 6 that vents to the atmosphere through a suitable opening 14 in a known manner. A valve 40 is mounted to close each of the illustrated vent ports. In a typical installation, each fuel tank 2 would also be provided with a climb vent port (not shown) in the forward portion of the tank 2. In a dive condition, the climb ports would be submerged in the fuel F and the illustrated dive vent ports in the rear of the tanks 2 would be above the fuel level. In this condition, each of the illustrated valves 40 would be open.

FIG. 2 illustrates in somewhat schematic form one of the fuel tanks 2 shown in FIG. 1. The level of the fuel F is shown below the valve 40, as it would be when the aircraft is in level flight, in a dive, or on the ground. The arrows in FIG. 2 illustrate the introduction of fuel into the tank 2 through a fuel inlet opening 16. As fuel is introduced into the tank 2 because of movement of fuel from other tanks or a refueling operation, the air in the ullage area 4 above the fuel level is vented to atmosphere through the vent port and the vent line 8. The end of the vent line 8 in the tank 2 forms a standpipe 10 with an upwardly facing vent port which the valve 40 operates to open and close. This standpipe arrangement is structurally simple and facilitates the positioning of the port and valve 40 as close as possible to the top of tank 2 to help maximize the real capacity of the tank 2.

Figure 3:
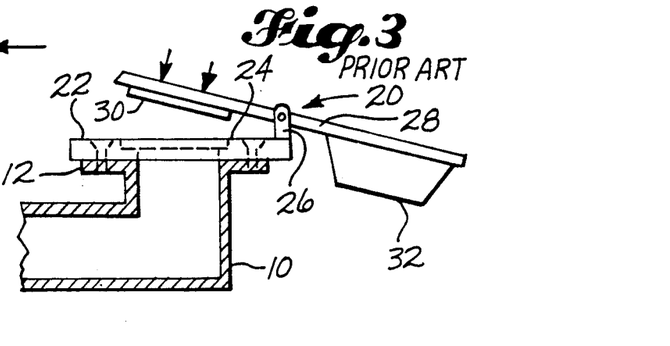
FIG. 3 is a somewhat schematic elevational view of a known type of float valve, with the standpipe shown in section.
Figure 4:
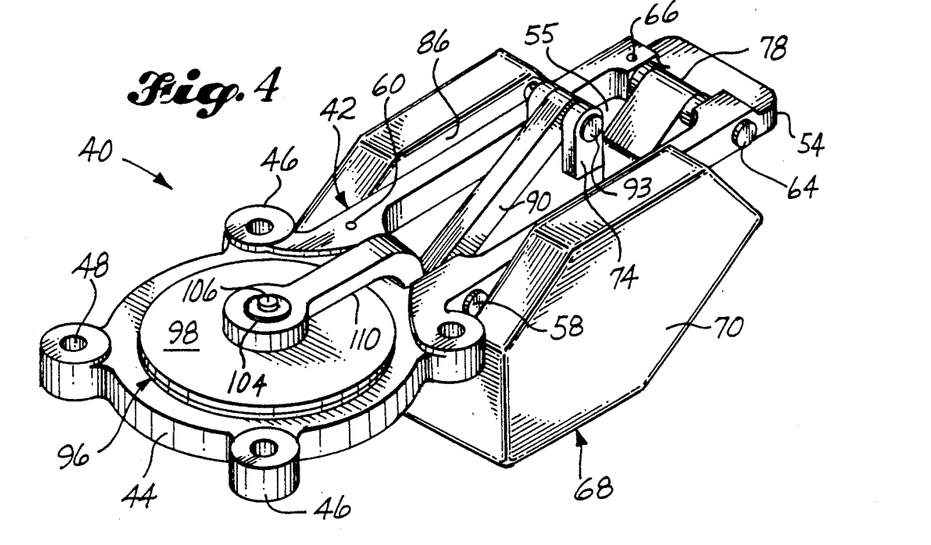
FIG. 4 is a pictorial view of the preferred embodiment of the invention.
Figure 5:
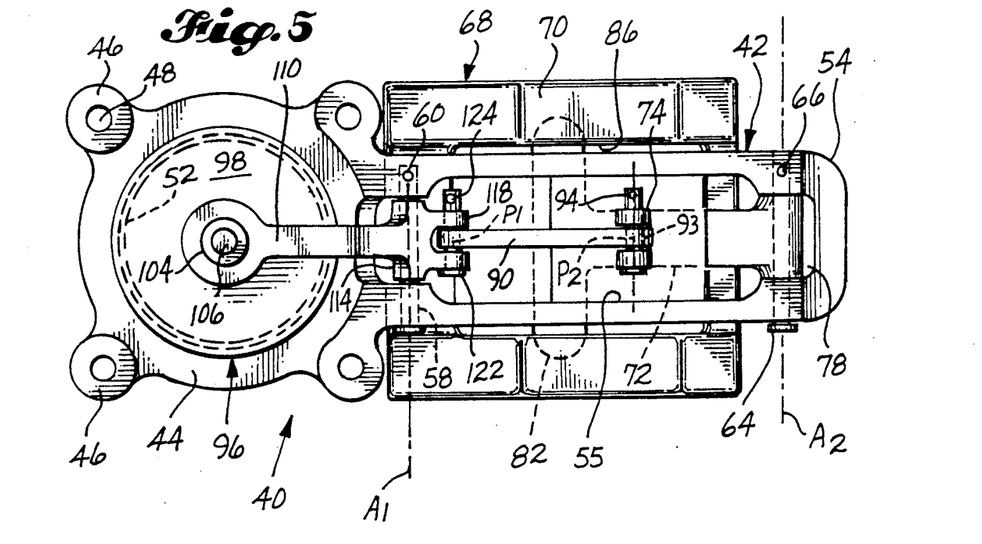
FIG. 5 is a top plan view of the valve shown in FIG. 4.

For purposes of comparison, a known type of float valve 20 for closing vent openings in fuel tanks is shown in FIG. 3. The valve 20 has a mounting disk 22 which is secured to an outer radial flange 12 that surrounds the open port end of the standpipe 10. The disk 22 forms a valve seat 24. A lug 26 projects upwardly from the disk 22. A midportion of a lever 28 is pivotably attached to the lug 26. A valve plug 30 is attached to one end of the lever 28, and a float 32 is attached to the other end. In the operation of the valve 20, a rising fuel level moves the float 32 upwardly to pivot the valve plug 30 into sealing engagement with the seat 24. As discussed above, this type of known valve presents the problem of a tendency to close in response to a pressure differential across the valve 20 even though the fuel level is below the float 32. For example, when the pressure in the ullage area 4 is higher than the outside ambient pressure, as indicated by the arrows in FIG. 3, the action of the higher pressure on the valve plug end of the lever 28 tends to move the lever 28 into a position in which the valve plug 30 is seated.

In the valve of the invention, a four-bar linkage forms a self-locking over-center latch to prevent the valve from being closed by a pressure differential across the valve, vibrations or other factors in the absence of positive movement of the float by a rising liquid level. The valve includes a valve element and a float which are separately pivotably mounted to a fixed structure. A toggle link connects the valve element to the float. The connecting link causes pivotal movement of the float to pivot the valve element between open and closed positions. When the liquid level in the tank in which the valve is installed is below a predetermined level, the float is in a down position, and the valve element is in an open position. In order for the valve element to move into its closed position, the pivot point at which the float is connected to the toggle link must pass over center, i.e. over a center line defined between the pivot connection of the link to the valve element and the pivot connection of the float to the fixed structure. The four pivot points of the valve and the dimensions of the elements of the valve are arranged so that a pressure differential or vibrations are insufficient to move the float into its up position past the center line, but the positive force of a rising liquid level is sufficient to move the buoyant float upwardly and thereby close the valve.

The preferred embodiment of the valve of the invention is shown in FIGS. 4-8. The valve 40 includes a mounting plate 42 that is adapted to be secured to the outer radial flange 12 of a standpipe 10 to form a fixed structure for pivotal mounting of the valve element 96 and the float 68. The plate 42 is shown scoured to a standpipe 10 in FIGS. 7 and 8. One end of the plate 42 forms an annular mounting portion 44 with four circumferentially spaced round projections 46 extending radially from its periphery. Each of the projections 46 has an opening 48 extending therethrough for receiving a fastener 50 to attach the plate 42 to the standpipe flange 12. The mounting portion 44 has a center opening 51 extending vertically therethrough which is aligned with the open top end of the standpipe 10. A valve seat 52 is defined by the upper surface of the mounting portion 44 surrounding the opening 51.

The plate 42 has an extension 54 that projects radially outwardly from the mounting portion 44. Together, the mounting portion 44 and extension 54 form a substantially flat rigid structure. The extension 54 is generally rectangular and is cantilevered outward from the standpipe 10 in the type of installation shown in FIGS. 7 and 8. A central opening 55 extends vertically through the extension 54. A pair of aligned holes 56 extend horizontally through the extension portion 54 adjacent to the mounting portion 44. A pivot pin 58 is received through these holes and secured by a rivet 60 to pivotably mount the valve element 96 on the plate 42, as described further below. A second pair of holes 62, parallel to the holes 56, extend through the extension portion 54 adjacent to its outer end opposite the mounting portion 44. These holes 62 receive a pivot pin 64 secured by a rivet 66 for pivotably mounting the float 68 to the plate 42.

Figure 6:
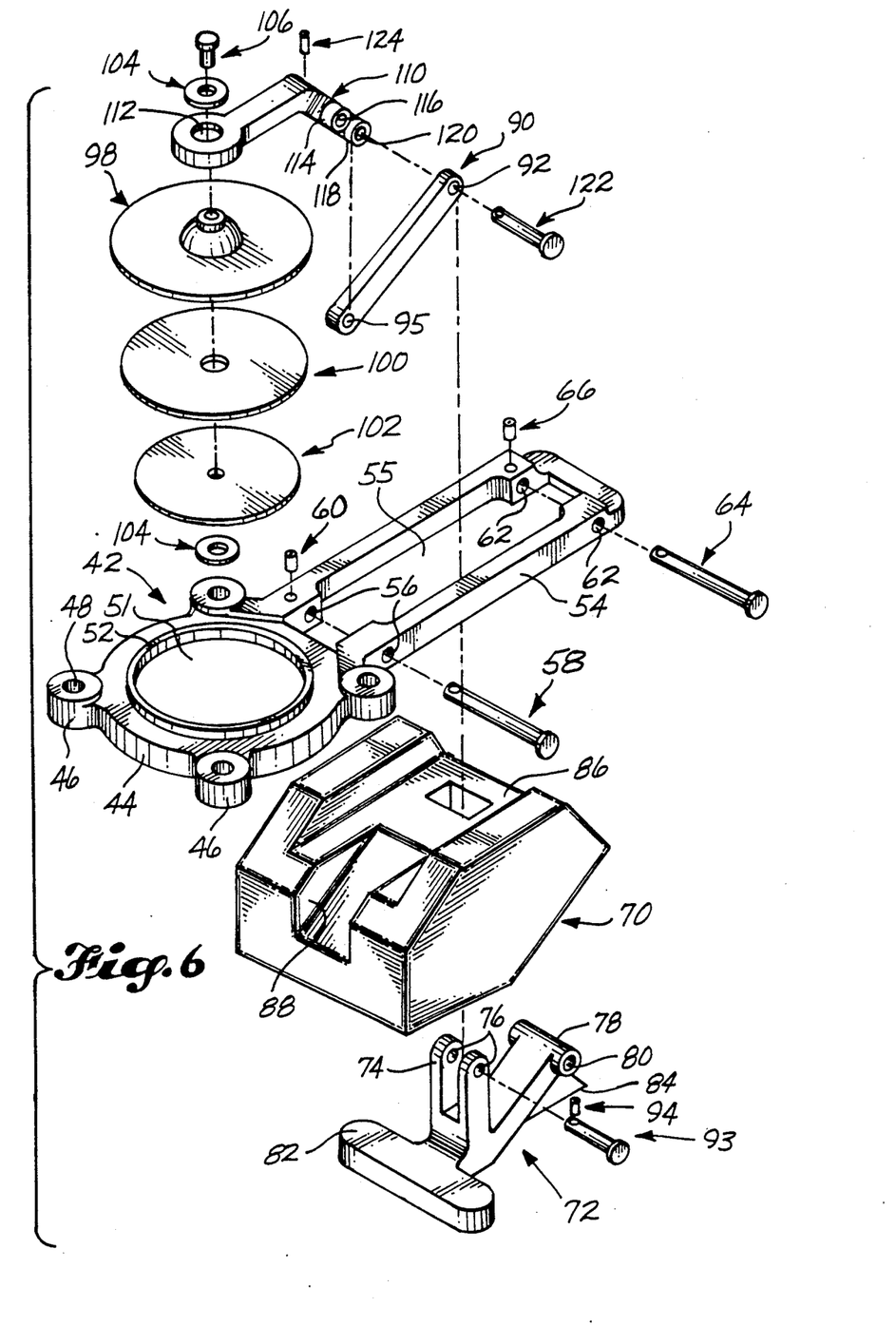
FIG. 6 is an exploded pictorial view of the valve shown in FIGS. 4 and 5.

The float 68 includes a foam body 70 and a lug member 72. These two members 70, 72 of the float 68 may be separately formed and joined by fasteners. However, the currently preferred method for joining the members 70, 72 into a single intrical structure is to directly mold the foam body 70 around the lug member 72. The lug member 72 is formed from a strong material, such as metal or reinforced plastic, and is positioned in a mold. Then a foam material, such as urethane foam, is introduced into the mold cavity to mold the foam and incorporate the lug member 72 into the foam body 70 in one simple procedure. In addition to facilitating manufacture of the valve 40, this procedure also helps reduce the number of parts required to make the valve 40 and provides a highly durable fully integrated float structure 68.

FIG. 6 is an exploded pictorial view of the valve 40. For the purpose of clearly illustrating the structure of the lug member 72 by itself, the member 72 is shown separate from the foam body 70 in FIG. 6. However, the foam body 70 would, of course, not exist separately from the lug member 72 in actual practice since it is molded around the lug member 72.

Referring to FIG. 6, the lug member 72 includes an upwardly projecting bifurcated yoke 74. Aligned holes 76 extend through the two arms of the yoke 74 for receiving a pivot pin 93, as described further below. The member 72 also includes a lug 78 which projects upwardly and rearwardly from the base of the yoke 74. The rounded outer end of the lug 78 has a hole 80 extending therethrough for receiving the pivot pin 64. A stop portion 84 extends downwardly and rearwardly from the lug 78. A flat, laterally elongated key portion 82 is formed on the forward end of the member 72. In the integrated float 68, the key 82 strengthens the connection between the foam body 70 and the lug member 72. The yoke 74, lug 78, and stop 84 project outwardly from the foam body 70. The foam body 70 has a wide recess 86 formed on its upper portion and a narrower diagonal recess 88 communicating with the recess 86. These recesses 86, 88 provide clearance for the float 68 when it is in its up position, as discussed further below, and help maintain the compactness of the valve structure.

The valve element 96 includes a cap 98 having a lower surface to which a disk-shaped seal 100 is secured. A diskshaped seal retainer 102, with a diameter smaller then the seal 100, is positioned abutting the seal 100 opposite the cap 98. The assembly of the cap 98, seal 100, and seal retainer 102 is secured by means of a rivet 106 and two washers 104. When the valve element 96 is in its closed seated position, the seal retainer 102 fits down into the center opening 51 in the mounting portion 44 of the plate 42, and the seal 100 sealingly engages the seat 52.

The valve element 96 also includes a lever arm 110 secured to a top portion of the cap 98 by means of the rivet 106. The domed top of the cap 98 is received into an opening 112 through the end of the arm 110. The arm 110 extends from its rivet connection parallel to the seal 100 and then diagonally downwardly. Two yokes 114, 118 are formed on the diagonal portion of the arm 110. The first yoke 114 is formed on a mid portion of the diagonal portion and has an opening 116 extending therethrough for receiving the pivot pin 58. The other yoke 118 is bifurcated and is formed on the distal end of the arm 110. It has aligned openings 120 extending therethrough for receiving a pivot pin 122.

The toggle link 90 is a simple flat member with a hole 92, 95 extending laterally therethrough on each of its opposite ends. One end of the link 90 is pivotably connected to the outer bifurcated yoke 118 of the lever arm 110 by means of the pivot pin 122 which extends through the holes 95, 120 in the link 90 and yoke 118, respectively. A rivet 124 secures the pin 122 to the yoke 118. The other end of the link 90 is pivotably attached to the bifurcated yoke 74 projecting upwardly from the float 68 by the same type of pin 93 and rivet 94 connection.

The assembled valve 40 is shown in FIGS. 4, 5, 7, and 8. In the assembled valve 40, there are four parallel pivot axes. The two fixed axes $A_1$, $A_2$ are defined by the spaced pairs of aligned holes 56, 62 in the plate 42. The valve element 96 is mounted on the plate 42 by the pivot pin 58 to pivot about the first fixed axis $A_1$. The float 68 is mounted on the plate 42 by the pivot pin 64 to pivot about the second fixed axis $A_2$. The pivotal connections between the toggle link 90 and the valve element 96 and the float 68 define the other two axes. The pivot point $P_1$ between the valve element 96 and the link 90 is spaced from the first fixed axis $A_1$. The pivot point $P_2$ between the link 90 and the float 68 is spaced from the second fixed axis $A_2$.

The operation of the valve 40 is illustrated in FIGS. 7 and 8. The down position of the float 68 is shown in FIG. 7. In this position, the pivot point $P_2$ defined by the connection of the yoke 74 to the toggle link 90 is below the center line C extending between the second fixed axis $A_2$ and the first pivot point $P_1$. The valve element 96 is in its open position.

The up position of the float 68 and the closed position of valve element 96 are illustrated in FIG. 8. In this position, the pivot point $P_2$ is above the center line C. Therefore, in order for the valve element 96 to move into its closed position and close the vent opening defined by the top of the standpipe 10, the pivot point $P_2$ must pass over-center. The over-center movement of the float 68 between its down and up positions provides the desired security against inappropriate closing of the valve element 96. Air flow in both directions across the valve 40 can occur without disturbing the venting function of the valve 40.

FIGS. 7 and 8 also illustrate the manner in which the parts of the valve 40 interact to limit movement of the float 68 and the manner in which clearance is provided to allow movement of the float 68 into its up position shown in FIG. 8. The stop 84 formed on the rear end of the float 68 by the lug member 72 engages the underside 67 of the rear end of the plate 42 when the float 68 moves into its down position shown in FIG. 7. The contact between the stop 84 and the stop surface 67 formed by the plate 42 limits downward movement of the float 68. The upward movement of the float 68 is limited by seating of the valve element seal 100 against the plate 42. When the float 68 moves upwardly, the plate 42 is received into the wider recess 86 on the top of the foam float body 70. The link 90 is received into the narrower diagonal recess 88 so that the link 90 pivots freely. The bifurcated yoke 74 of the float 68 and the attached end of the link 90 extend upwardly through the opening 55 in the cantilevered extension 54 of the plate 42. The result is the compact configuration shown in FIG. 8.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A float valve for closing a vent opening in a ullage area of an aircraft fuel tank in response to a liquid level in the tank rising toward said opening, comprising:

a valve element mounted to pivot about a first fixed axis between a closed position in which it closes said opening, and an open position in which it allows flow of gas through said opening into and out from said ullage area;

a float mounted to pivot about a second fixed axis between a down position and an up position;

a toggle link having a first end portion pivotably connected to said valve element at a first pivot point spaced from said first axis, and a second end portion pivotably connected to said float at a second pivot point spaced from said second axis;

said axes and said pivot points being positioned so that said second pivot point must cross a center line extending between said first pivot point and said second axis when said float moves from said down position to said up position; and so that movement of said float into its up position and down position pivots said valve element into its closed position and open position, respectively.

2. The valve of claim 1, comprising a mounting plate to which said valve element and said float are pivotably mounted to pivot about said first and second axes, respectively; said plate having an opening extending therethrough to provide clearance for said second pivot point when said float moves into its up position.

3. The valve of claim 2, in which said float includes a projecting mounting lug to which said toggle link is pivotably connected.

4. The valve of claim 2, in which said plate includes a stop surface that engages a portion of said float to limit downward movement of said float.

5. The valve of olaim 2, in which said plate includes a valve seat that said valve element sealingly engages when said element is in its closed position, and mounting portions around said seat adapted to be secured to an outer flange portion of a standpipe.

6. The valve of claim 5, in which said plate includes a stop surface that engages a portion of said float to limit downward movement of said float.

7. The valve of claim 5, in which said float includes a projecting mounting lug to which said toggle link is pivotably connected.

8. The valve of claim 4, in which said float includes a projecting mounting lug to which said toggle link is pivotably connected.

9. The valve of claim 8, in which said plate includes a valve seat that said valve element sealingly engages when said element is in its closed position, and mounting portions around said seat adapted to be secured to an outer flange portion of a standpipe.

* * * * *

UNITED STATES PATENT AND TRADEMARK OFFICE
CERTIFICATE OF CORRECTION

PATENT NO. : 5,031,655
DATED : July 16, 1991
INVENTOR(S) : Michael B. Hebaus

It is certified that error appears in the above-identified patent and that said Letters Patent is hereby corrected as shown below:

Col. 2, line 2, there is a period after "aircraft".

Col. 3, line 28, there is a period after "position".

Col. 3, line 30, "valved" should be -- valve which it carries up and --.

Col. 6, line 66, "scoured" should be -- secured --.

Col. 10, first line of claim 5, "olaim" should be -- claim --.

Signed and Sealed this

Fifteenth Day of December, 1992

Attest:

DOUGLAS B. COMER

*Attesting Officer*     *Acting Commissioner of Patents and Trademarks*